Sept. 26, 1967           G. BUKI           3,344,035
NUCLEAR REACTOR WITH SPHERICAL ACTIVE ZONE
Filed May 21, 1965
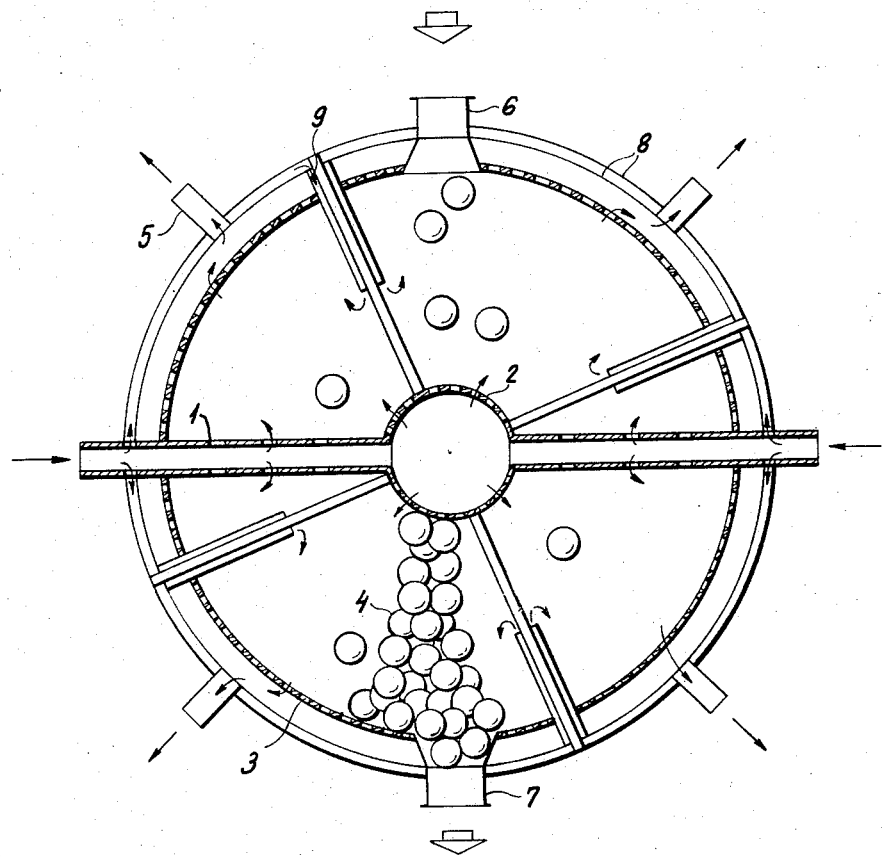
INVENTOR
GERGELY BUKI
BY

United States Patent Office 3,344,035
Patented Sept. 26, 1967

3,344,035
NUCLEAR REACTOR WITH SPHERICAL
ACTIVE ZONE
Gergely Büki, Budapest, Hungary, assignor to Magyar Tudomanyos Akademia Kozponti Fizikai Kutato Intezete, Budapest, Hungary
Filed May 21, 1965, Ser. No. 457,734
Claims priority, application Hungary, May 28, 1964, Bu 337
5 Claims. (Cl. 176—61)

In heterogeneous atomic reactors operating on the principle of nuclear fission used for generating electrical or caloric energy in atomic power stations, the active zone has conventionally either a cylindrical or an almost cylindrical prismatic shape, containing the fissile material, the moderator, and the coolant. The active zone of the reactor is generally given a cylindrical shape even if the reactor itself is disposed in a spherical pressure-tight vessel, to be termed "pressure vessel" hereinafter. While it is true that such a design seems to be obvious in the case of reactors used for energetic purposes, with a view to the construction of the cooling channels and the whole cooling system, it has, however, considerable drawbacks from the aspect of reactor physics, mechanical strength, and thermotechnics. The most important drawbacks connected with cylindrical active zones are as follows:

(a) The reactor-physical characteristics are unfavourable, because the critical size is larger, the reactivity lower, the distribution of the neutron flux and the burn out of the fuel less uniform, than in a spherical active zone with identical lattice structure and material composition.

(b) When a cylindrical active zone is enclosed in a cylindrical pressure vessel, the mechanical strength of the latter is unfavourable. On the other hand, if a spherical pressure vessel is used with a cylindrical active zone in order to obtain optimum strength, the vessel necessarily has unduly large dimensions. Accordingly, space utilisation is less favourable than in the case of a compact spherical active zone built in a spherical pressure vessel.

(c) A cylindrical active zone is furthermore undesirable for thermotechnical and thermodynamical reasons, since the lack of uniformity in neutron flux referred to under (a) equally causes a fluctuating heat output per unit of volume along the reactor space. In addition, due to the non-uniform distribution of heat sources in the known cooling systems, the temperatures permissible in the temperature-restricting media (fuel and its cladding) cannot be achieved along the total volume of the reactor.

It has been found that the above described disadvantages may be eliminated and a reactor superior to cylindrical reactors, both from the aspect of reactor physics, strength and thermotechnics, while having a simpler structure, may be created if the active zone has the shape of a spherical shell limited by an internal and an external perforated spherical surface, and if the inlet pipes for the coolant passing through the active zone are connected to the hollow sphere containing no fuel, and limited by an internal perforated spherical surface, while the outlet pipes for the coolant are connected to the external perforated spherical surface.

An embodiment of the atomic reactor according to the invention is exemplified hereinafter with reference to the accompanying drawing.

The active zone of the reactor is designed as a hollow sphere. The cold coolant is fed to the internal hollow sphere containing no fissile material through one or more pipes 1. The fissile material, for instance in the form of spheres 4, and the moderator are present only in the active zone having the shape of a spherical shell and situated between the internal and external perforated or lattice-like spherical surfaces 2 and 3. The active zone may have a different lattice structure and, if shaped as spherical surface, it may enclose the fuel for example in the form of spheres 4. The coolant streaming from the internal hollow sphere toward the outside, passes through the active zone and after being heated, is discharged through one or more pipes 5. The fuel spheres 4 are fed to the active zone through an inlet opening 6 and when burnt out are removed through a second opening 7.

The active zone is surrounded by a spherical, double-walled, pressure vessel 8, through which pass not only the inlet and outlet pipes for the coolant, but also the tubes 9 containing the control rods and the safety rods. Further components of the reactor, such as reflector, biological shield etc. may be made in the case of the spherical active zone just like with the conventional cylindrical active zones.

It is advisable not to introduce the total amount of coolant into the internal hollow sphere, but to provide, in the walls of the inlet pipes 1 for the coolant, apertures through which part of the coolant is radially distributed prior to passing directly into the active zone. In this manner the flow resistance decreases, and the maximum temperature in the fuel is better compensated in the reactor volume.

It is possible to control the feeding rate of the coolant in such a manner that the temperature of the coolant introduced at points of different radii is identical with the temperature of the coolant prevailing at the corresponding spot of the active zone.

It is advantageous to use part or all of the cold coolant entering the reactor for first cooling the double-walled pressure vessel 8, then the pipes 9 for the control rods, and finally other components protruding into the active zone. This portion of the coolant is either mixed with the warm coolant discharged from the reactor, or is led to some point of the active zone having a similar temperature.

What I claim is:
1. A heterogeneous atomic reactor operating on the principle of nuclear fission, comprising, a pressure vessel, an outer perforated spherical member, and an inner perforated spherical member disposed within said pressure vessel, an active zone containing fuel bounded by said external and internal spherical members, a spherical active zone containing no fuel bounded by said inner perforated spherical member, at least one inlet pipe for the passage of coolant therethrough connected at one end to said spherical active zone containing no fuel, and at least one outlet pipe connected to said pressure vessel for the discharge of coolant therethrough from said outer perforated spherical member.

2. An atomic reactor as claimed in claim 1 wherein said inlet pipes for the passage of coolant therethrough are perforated and extend radially through said active zone.

3. An atomic reactor as defined in claim 1 including at least one additional inlet tube for the passage of coolant therethrough, said additional inlet tubes having their outlet end opening into said active zone between said outer and inner perforated spherical members.

4. An atomic reactor as defined in claim 1 wherein said pressure vessel comprises an outer wall and an inner wall, said inlet pipes being extended at the other end through the space between said inner and outer walls.

5. An atomic reactor as defined in claim 4 wherein each of said outlet pipes extends through said space between said outer and inner walls.

References Cited

UNITED STATES PATENTS

| 2,994,651 | 8/1961 | Spence | 176—39 X |
| 3,140,235 | 7/1964 | Hatch et al. | 176—61 X |
| 3,150,054 | 9/1964 | Fox | 176—39 X |
| 3,155,596 | 11/1964 | Frederick | 176—39 X |

FOREIGN PATENTS 633,107  12/1961  Canada.

REUBEN EPSTEIN, *Primary Examiner.*